United States Patent [19]

Muraki et al.

[11] 4,188,190
[45] Feb. 12, 1980

[54] INPUT CONTROL METHOD AND MEANS FOR NITROGEN OXIDE REMOVAL MEANS

[75] Inventors: Ryoji Muraki, Nishinomiya; Shinichiro Takemura, Osaka; Yoshio Ohashi, Tokyo; Athushi Ichioka, Machida, all of Japan

[73] Assignees: Kurashiki Boseki Kabushiki Kaisha Kurashiki; Tokyo Shibaura Electric Co. Ltd., Kawasaki, both of Japan

[21] Appl. No.: 747,687

[22] Filed: Dec. 6, 1976

[30] Foreign Application Priority Data

Mar. 23, 1976 [JP] Japan .................................. 51/30887
Jun. 17, 1976 [JP] Japan .................................. 51/70404

[51] Int. Cl.$^2$ ........................................... G05D 11/02
[52] U.S. Cl. ................................... 23/232 R; 364/500; 422/83; 422/94; 422/111
[58] Field of Search .......... 23/253 A, 230 A, 230 PC, 23/253 PC, 254 R, 254 E, 255 R, 255 E, 284, 232 R; 364/500

[56] References Cited

U.S. PATENT DOCUMENTS

| | | | |
|---|---|---|---|
| 3,721,253 | 3/1973 | Remke et al. .................... | 23/253 A |
| 3,960,507 | 6/1976 | Tsujikawa et al. ................ | 23/284 X |
| 4,038,032 | 7/1977 | Brewer et al. .................... | 23/253 A |

OTHER PUBLICATIONS

Savas, "Computer Control of Industrial Processes", McGraw-Hill, (1965) pp. 20-27, 52 and 53.

Primary Examiner—R. E. Serwin
Attorney, Agent, or Firm—Wenderoth, Lind & Ponack

[57] ABSTRACT

Method and apparatus for control of input to an apparatus for removal of nitrogen oxides from flue-gas by injection of a nitrogen oxide reducing agent according to which the level of nitrogen oxide concentration in the flue-gas can be selectively determined in reference to different factors relating to a combustion process, a first value indicating the amount of nitrogen oxide reducing agent to be injected is calculated on the basis of the determined level of nitrogen oxide concentration, and this first value is modified in accordance with nitrogen oxide removal efficiency actually achieved, and the rate of supply of the nitrogen oxide reducing agent is adjusted in accordance with the modified value obtained, whereby more precise and reliable input control is achieved.

20 Claims, 6 Drawing Figures

INPUT CONTROL METHOD AND MEANS FOR NITROGEN OXIDE REMOVAL MEANS

The present invention relates to a method and means for control of input to means for removal of nitrogen oxides from flue-gas. More particularly the invention relates to a method and means for nitrogen oxide removal means input control by which input to a nitrogen oxide removal means is selectively controlled in response to various factors, which are weighted in a precise manner, whereby nitrogen oxide removal is rendered more efficient and reliable.

It is known that, although on a global basis man-caused emission of nitrogen oxide, NO, and nitrogen oxides, represented by the formula $NO_x$, that is, the composite atmospheric concentration of nitrogen monooxide, NO, and nitrogen dioxide, $NO_2$, is much less than that produced by natural sources, man-caused $NO_x$ emissions may result in high local concentration of $NO_x$, and that when present at certain levels of concentration in a given locality $NO_x$ constitutes a pollutant which as such has an adverse effect on human health and which also contributes to formation of photochemical smog. Since such levels of $NO_x$ concentration are regularly achieved in certain areas, it is a desideratum, and in some areas a legal obligation, to effect reduction of concentrated local emission of nitrogen oxides. Principal sources of man-caused $NO_x$ emission are motor vehicles and stationary combustion sources, such as boiler units for power stations, for example, whereat fuel combustion is effected, nitrogen oxides being produced as a result of oxidation of nitrogen released from the fuel during the combustion process. Oxidation of nitrogen is favoured by high temperature, and the main parameters governing $NO_x$ production in a boiler unit or similar stationary source are peak flame temperature, the amount of air which is in excess of the amount necessary for the combustion process and so is available for oxidation of liberated nitrogen, and, because of the factor of reaction kinetics, the length of time combustion when gases are at or near peak flame temperature.

Another important factor is of course the amount of bound nitrogen in the combustion fuel employed, but as this normally cannot be arbitrarily selected or determined by persons responsible for running a power plant, etc., it does not serve as a control parameter in $NO_x$ removal processes.

It is known therefore to control $NO_x$ production and emission by modifying combustion conditions, for example, by using less excess oxygen, by installing two-stage combustion equipment or flue-gas recirculation means, or by altering burner design or angle of firing. However, it is known that $NO_x$ emission is liable to vary widely as a result of even minor variations in the above-noted parameters, and in a practical fuel combustion installation there is always liable to be temporary fluctuation of combustion conditions which may result in production of $NO_x$ in excess of a desired or prescribed amount, even if modification of the installation is such as to achieve the critically maximum reduction of $NO_x$ emission. It is therefore the practice to effect removal of nitrogen oxides at an end stage of a process performed at a fuel combustion installation, more particularly, to remove nitrogen oxides from flue-gas prior to delivery of the flue-gas to a stack. As well as being necessary even in completely new installations, flue-gas cleaning offers particular advantages in existing installations since it does not demand major modification of an installation but only requires employment of so-called "add-on" equipment, i.e., equipment which is readily mounted on or in existing equipment without requiring the existing equipment to be changed.

In known methods, removal of $NO_x$ from flue-gas of a boiler or other heater is generally effected by injection of a reducing agent which reacts with the $NO_x$ to produce harmless substances. In the so-called dry process, for example, during transport of the flue-gas to a stack the flue-gas is passed through a cleaning unit wherein it is brought into contact with ammonia gas, $NH_3$, which is injected into the cleaning unit and, acting as a reducing agent, combines with the $NO_x$, mainly NO at this stage, to form $(N_2 + H_2O)$. It is also known to convert nitrogen oxides in flue-gas by injection of other substances, for example carbon monoxide, CO, or carbon hydride HC.

Whatever substance is employed as the $NO_x$ reducing agent, in order to know how much should be injected in order to achieve efficient conversion of $NO_x$, it is of course necessary to know how much $NO_x$ there is in the flue-gas. With respect to this point ammonia gas has an advantage over other substances employed in that efficient $NO_x$ conversion is effected when there is an equal number of moles of $NO_x$ and of $NH_3$, whereas the number of moles of other substances must be a multiple of the number of moles of $NO_x$. In other words, any error of determination of the amount of $NO_x$ is multiplied when the required amount of these other substances is calculated. In all cases, however, if the amount of $NO_x$ is not correctly determined either an insufficient or an excessive amount of $NO_x$ reducing agent is injected. If an insufficient amount of $NO_x$ reducing agent is injected, removal of $NO_x$ is not correctly effected. On the other hand, it is generally undesirable to inject too much $NO_x$ reducing agent. Ammonia gas, for example, can itself constitute a pollutant if released unconverted into the atmosphere.

Figure 1:
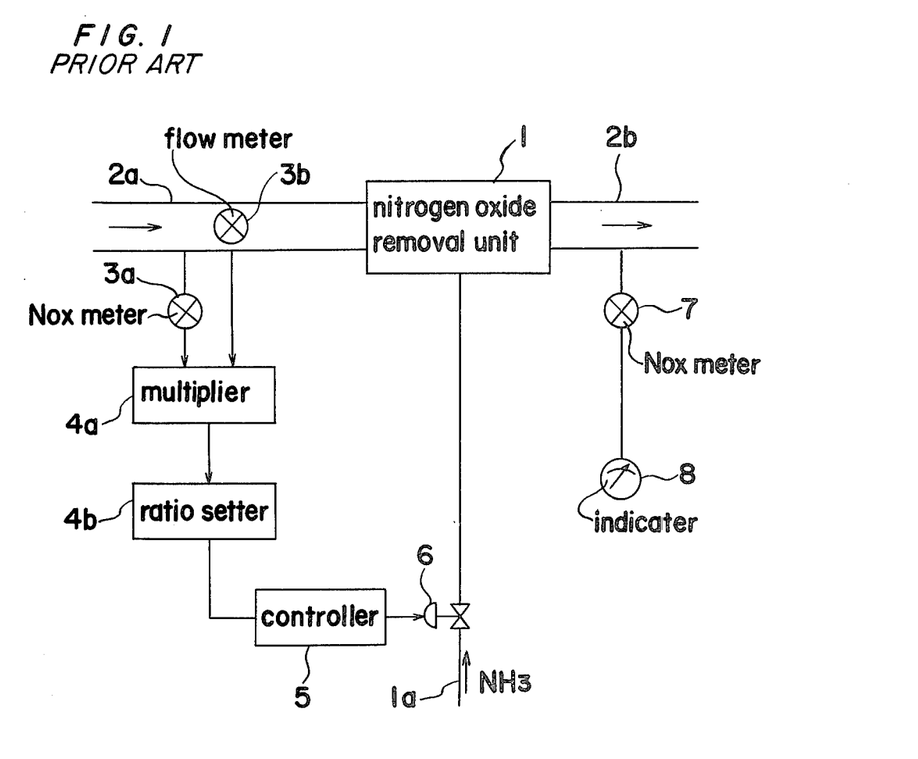
FIG. 1 is a block diagram of a conventional nitrogen oxide removal unit control means.

It is known conventionally to control input to a means for effecting removal of nitrogen oxides from fluegas by means such as shown in FIG. 1 in which flue-gas being exhausted from a boiler unit or similar installation passes along an exhaust pipe 2a, then through a nitrogen oxide removal unit 1, and then through an exhaust pipe 2b leading to a stack or other discharge means. Flue-gas passing through the removal unit 1 has injected thereinto a nitrogen oxide conversion or reducing agent, for example ammonia gas, which is supplied to the removal unit 1 at a rate determined by the degree of opening of a control valve 6 provided on the ammonia gas supply line 1a. The degree of opening of the control valve 6 is controlled by a controller 5 in response to output from a ratio setter 4b. The ratio setter 4b receives input indicating multiplication results obtained by a multiplier 4a, which multiplies the values of input supplied thereto by a $NO_x$ meter 3a and a flow meter 3b which respectively determine the concentration of nitrogen oxide and the rate of flow of flue-gas in the exhaust pipe 2a, the results obtained by the multiplication circuit 4a thus being indicative of the total amount of nitrogen oxide present in the exhaust pipe 2a. At any given stage the ratio setter 4b calculates the amount of ammonia gas required to effect efficient conversion of the particular amount of nitrogen oxide present in the exhaust pipe 2a and also calculates the degree to which the control valve 6 is required to be opened in order to effect supply of this amount of ammonia gas, the output from the ratio setter 4b being supplied to the controller 5 as noted above, and of course varying as the amount of nitrogen oxide in the exhaust pipe 2a varies. In such a means it is customary to provide on the exhaust pipe 2b a second nitrogen oxide concentration $NO_x$ meter 7 which supplies input to a indicator 8 and makes it possible for staff to determine whether or not the nitrogen oxide removal unit is functioning efficiently.

A major problem in such a control system is that of reliability, since metering elements are exposed to highly corrosive and dirty conditions, and are therefore liable to function incorrectly after being in service for a certain time, even if the metering elements are completely packaged units. More important is the fact that since the calculated amount of nitrogen oxide is determined entirely on the basis of measurements made in one and the same portion of a heating installation, injection of correct amounts of nitrogen oxide reducing agent is entirely dependent on correct functioning of the meters employed in this portion of the heating installation and there is no safeguard against or compensation for any malfunction of the meters.

It is an important object of the invention to provide a method and means wherein factors employed in control of a nitrogen oxide removal means are balanced and selectively employed in a manner such that malfunction of metering equipment employed for control purposes in a particular part of a heating installation does not result in injection of an incorrect amount of nitrogen oxide reducing agent into flue-gas.

In another known method for controlling nitrogen oxide emissions, problems of corrosion of metering equipment are largely avoided since there is employed means which controls supply of fuel to the burner or burners of a heating unit and simultaneously controls the rate at which a nitrogen oxide reducing agent is injected into flue-gas, the supply rate of this reducing agent being proportional to the fuel supply rate, and the control means having associated therewith a suitable computing unit for calculating the required amount of nitrogen oxide reducing agent and the required degree of opening of the flow control means to effect supply of the calculated amount. This method has the advantage that the control system as a whole has a simple configuration and is easy to install. The method, however, has the disadvantage that the calculated amount of nitrogen oxide is only approximate, since there is a variable time delay between production of nitrogen oxides at the vicinity of a burner and arrival of the nitrogen oxides at the location of a nitrogen oxide removal unit, i.e., at a particular moment it can by no means be guaranteed that nitrogen oxide concentration in a particular portion of flue-gas exhaust pipe is the same as that in the vicinity of the burners. Another reason for imprecision in the calculated amount of nitrogen oxide is that although nitrogen oxide production is indeed dependent on the rate at which fuel is consumed and theoretically can be calculated with reference to this one factor, it is also dependent on other factors such as noted above, which in a practical heating installation are liable to vary, and it cannot be assumed that nitrogen oxide production is simply proportional to the rate of fuel supply alone.

It is accordingly another object of the invention to provide a method and means for control of a nitrogen oxide removal means wherein the calculated amount of required nitrogen oxide reducing agent is constantly modified by a correction factor calculated on the basis of nitrogen oxide removal results achieved, whereby more accurate control of the nitrogen removal means is effected.

It is a further object of the invention to provide a method and means for control of a nitrogen oxide removal means in which use is made of a formula employing values other than direct measurements of nitrogen oxide content but permitting accurate approximation of concentration of nitrogen oxide in the flue-gas.

It is another object of the invention to provide means for control of a nitrogen oxide removal means which is compact and easily installed.

In accomplishing these and other objects according to the invention, concentration of nitrogen oxides, $NO_x$, present in flue-gas which has not yet passed through an $NO_x$ removal unit is simultaneously determined in two ways, one way being to make a direct measurement and the other way being to calculate the $NO_x$ concentration by means of a formula employing at least two factors, which may be from among the factors of rate of supply of fuel to the heating unit, concentration of oxygen in the flue gas, concentration of carbon dioxide in the flue-gas, rate of flow of air used in the combustion process effected in the heating unit or amount of flue gas, these factors being weighted by empirically determined constants in a formula employed which gives values close to direct-measurement values. Calculated values and direct-measurement values of $NO_x$ concentration are both supplied to a computing unit and are there selectively employed for calculation of the requisite amount of $NO_x$ reducing agent to be injected into the flue-gas. As long as the $NO_x$ metering means is functioning correctly the measured value obtained therefrom can be expected to be closer to the true value of $NO_x$ concentration than indirectly determined values, but, as is known, if the $NO_x$ metering means becomes faulty, as is quite likely to happen due to the severity of ambient conditions, then values from the metering means may be completely meaningless. On the other hand, even without making direct measurement or calculation it is known within certain broad limits how much $NO_x$ is present in the fluegas of a particular heating unit. According to the invention, therefore, if the values obtained as output from the $NO_x$ metering unit are within these limits it is presumed that the metering unit is functioning correctly and the output thereof is employed for computation of the required amount of $NO_x$ reducing agent and the calculated value of $NO_x$ concentration is disregarded. If, however, output of the $NO_x$ metering unit is outside these limits, the calculated value of $NO_x$ concentration is used to compute the required amount of $NO_x$ reducing agent.

Since the ideal efficiency of $NO_x$ removal by a particular $NO_x$ reducing agent is known, i.e., for a given initial concentration of $NO_x$ and injection of a given amount of $NO_x$ reducing agent in flue gas it is known what the resulting $NO_x$ concentration should be, in order to give improved accuracy of $NO_x$ control, according to the invention $NO_x$ concentration in the flue-gas immediately subsequent to discharge as clean gas from a dinitrating apparatus including an $NH_3$ injection unit and a catalytic reactor is metered. If the metered concentration is for example higher than the concentration ideally achieved, then it is known that the calculated amount of $NO_x$ control agent is too low and this calculated amount is therefore modified by a factor determined with reference to the metered value of $NO_x$ in the flue gas after discharge as clean gas from the dinitrating apparatus.

If it is required to install a simplified means for control of $NO_x$ removal means input, for example when a heating installation causes relatively minor problems of $NO_x$ emission or when a heating installation is due for re-design or reconstruction, for example, and temporary $NO_x$ control is required until this re-design or reconstruction is completed, according to the invention the abovedescribed calculated value of $NO_x$ concentration in the upstream flue-gas may be determined on the basis of only one factor governing $NO_x$ emission, ideally, combustion fuel flow rate.

A better understanding of the invention may be had from the following full description of several preferred embodiments thereof when read in reference to the attached drawings in which like numbers refer to like parts, and in which.

Figure 2:
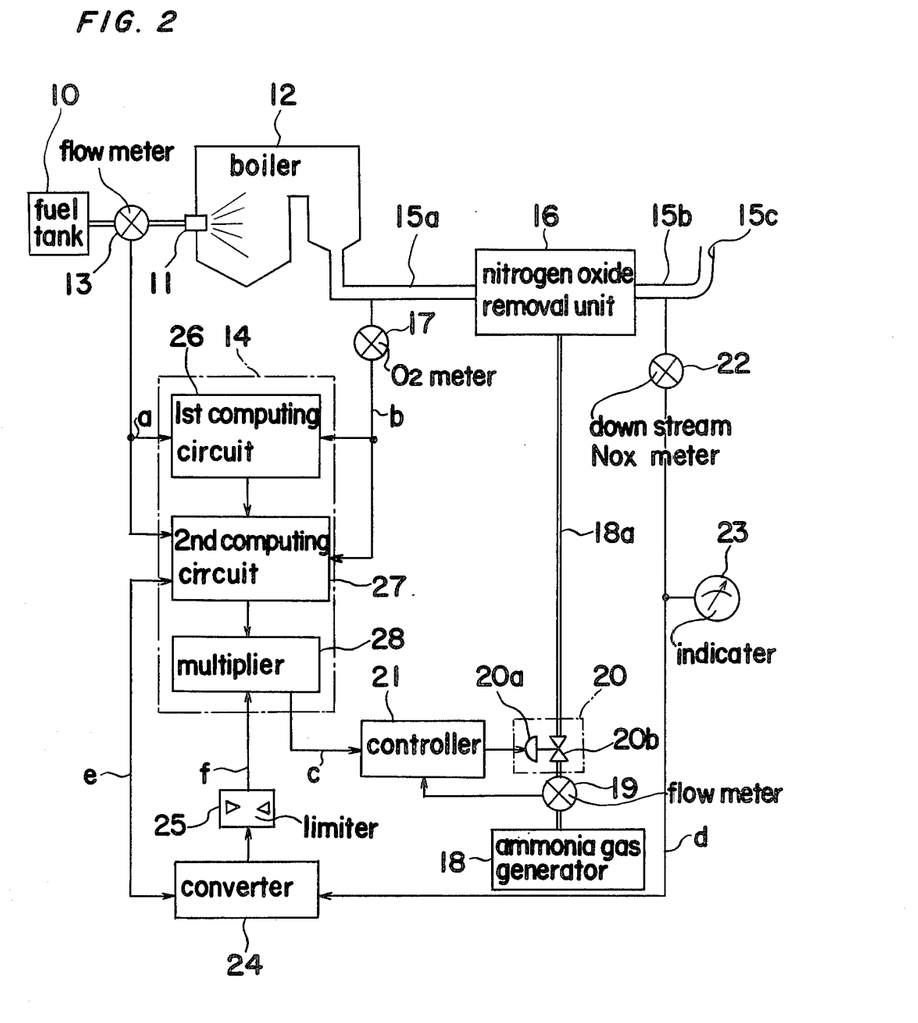
FIG. 2 is a block diagram of nitrogen oxide removal unit control means according to a first embodiment of the invention.

Referring to FIG. 2, there is shown a control circuit according to one embodiment of the invention in which the rate at which fuel, e.g., heavy oil from a fuel tank 10, is supplied to one or more oil-fired burners 11 employed in a boiler unit 12 is measured by a flowmeter 13 of the turbine or similar known type. The register of the flowmeter 13 is provided with an electrical take-off by which signals indicative of the measurements made by the flowmeter 13 are supplied along a line 'a' to a computing unit 14. The computing unit 14 is required to perform logic operations and the arithmetic operations of addition, subtraction, and multiplication, as described in greater detail below, and is suitably in the form of a micro-computer. Flue-gas is exhausted from the boiler unit 12 via an initial discharge pipe 15a which leads to a nitrogen oxide removal unit 16. After passing through the nitrogen oxide removal unit 16, the flue-gas is led along a continuation exhaust pipe 15b through other known means not shown, for removal of other pollutants, the flue-gas being eventually led to a stack 15c. Needless to say, the flue-gas may be led through means for removal of particulates or other pollutants not shown prior to being brought to the nitrogen oxide removal unit 16.

For brevity in the description below flue-gas flowing in the initial discharge pipe 15a upstream of the nitrogen oxide removal unit 16 will be referred to as 'upstream flue-gas' and flue-gas flowing in the continuation discharge pipe 15b downstream of the nitrogen oxide removal unit 16 will be referred to as 'downstream flue-gas'.

On the initial discharge pipe 15a there is provied an oxygen ($O_2$) meter or metering unit 17 including magnetic or other known types of gas analyzing elements and an electrical take-off which produce continuous output or output pulses indicative of values relating to the respective gases. Electrical output signals from the $O_2$ metering unit 17 are supplied along signal line 'b' to the computing unit 14. The metering unit 17 may be associated with a flue-gas flowmeter, or such a flowmeter may be separately provided, to permit the concentration of oxygen to be determined.

A reducing agent, for example ammonia gas, $NH_3$, is injected into flue-gas passing through the nitrogen oxide removal unit 16, the ammonia gas being supplied from a reservoir or ammonia gas generator 18 indicated schematically in a lower portion of the drawing along a supply line 18a on which there is provided a flowmeter 19 provided with an electrical take-off and a flow control valve means 20. The degree of opening of the flow control valve 20, and hence rate of supply of ammonia gas to the nitrogen oxide removal unit 16, is controlled by a controller or control unit 21 in response to input which is supplied from the computing unit 14 along a signal line 'c' to the control unit 21 and is indicative of $NO_x$ concentration in the flue-gas, and to input supplied from the flowmeter 19 and indicating current rate of supply of the ammonia gas, the control unit 21 acting through an electropneumatic actuator 20a or similar known means to open or close the flow control valve 20b.

On the continuation exhaust pipe 15b there is provided a downstream nitrogen oxide $NO_x$ meter or metering unit 22 including a chemical luminescent device or other known type of gas analyzing elements and an electrical take-off which produce continuous output pulses indicative of values relating to the respective gases, and which supplies input along a signal line 'd' to an indicator 23, provided to permit monitoring by staff, and to a converter or subtraction and conversion unit 24. The subtraction and conversion unit 24, the function of which is described in greater detail below, also receives input supplied along a signal line 'e' from the computing unit 14 and supplies output to a limiter 25. If output from the subtraction and conversion unit 24 is within a set range, the limiter unit 24 transmits the output unchanged along a signal line 'f' to the computing unit 14. If the output of the subtraction and conversion unit 24 is outside the set range, it is modified and transmitted to the computing unit 14.

The computing unit 14 includes a first computing circuit 26 which receives as input signals from the flowmeter unit 13 indicative of fuel supply rate through the signal line 'a' signals from the $O_2$ metering unit 17 indicative of concentration of oxygen present in the upstream flue-gas through the signal line 'b'.

The first computing circuit 26 calculates the concentration of nitrogen oxide in the upstream flue-gas as a function of fuel supply Q and oxygen $O_2$ present in the upstream flue-gas. The reasons for selecting these factors are that it is known that the quantity of $NO_x$ present in the upstream flue-gas is effectively the same as that produced by the combustion process, that, presuming sufficient air, the rate of supply of fuel is an important factor governing the combustion process, and that the amount of oxygen present in flue gas is indicative of the amount of excess air which was available for the combustion process, for example, 5% excess air resulting in approximately 1% $O_2$ in the flue-gas.

Figure 4:
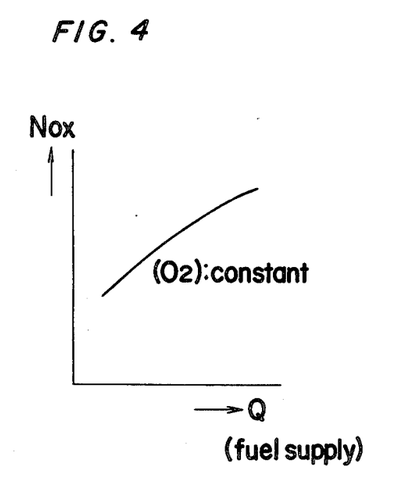
FIG. 4 is a graph plotting typical $NO_x$ concentration for conditions of constant oxygen and increasing fuel supply in a combustion process.

The general relationship between $NO_x$ concentration, represented by $NO_x$ on the ordinate, and fuel supply rate, represented Q by abscissa, presuming a constant air supply (vol), i.e., a constant oxygen $O_2$ concentration, is shown in the graph of FIG. 4, from which it is seen that after supply of fuel becomes such that sufficient heat is produced to cause production of $NO_x$ there is a more or less linear increase in $NO_x$ concentration with increased fuel supply.

Figure 5:
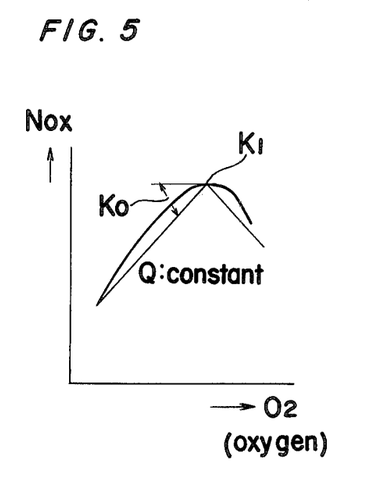
FIG. 5 is a graph plotting typical nitrogen oxide concentration for conditions of increasing oxygen and constant fuel supply in a combustion process.

The curve for $NO_x$ concentration when the fuel supply is maintained constant and the air supply, represented by $O_2$ on the abscissa, is steadily increased is somewhat different, as shown in FIG. 5. $NO_x$ concentration commences when the amount of air supplied is in excess of that required for the combustion process, and then increases at an increasing rate until a certain peak is reached, after which there is a fall in the concentration of $NO_x$ produced even though increased air is made available, since part of the heat produced by the combustion process must go to heat the extra air, whereby peak temperatures are reduced.

The portion of the curve of FIG. 5 which is of interest in a practical boiler or other heating installation is obviously the portion over which $NO_x$ concentration increases, and the exact shape of this curve of course varies somewhat depending on the grade or type of fuel employed, as does that of the curve of FIG. 4 also. In the method of the invention by employment of the factors of fuel supply rate and amount of excess air, concentration of nitrogen oxide in the flue-gas may be accurately approximated by the following formula;

$$(NO_x \text{ cal}) = a_0 + a_1 Q + a_2 Q^2 - K_0|(O_2) - K_1|\ldots \quad (1)$$

in which Q is the fuel flow rate, $(O_2)$ is the concentration of oxygen in the upstream flue-gas, Q and $(O_2)$ being respectively determined by the flowmeter 13 and metering unit 17 in the means of the invention shown in FIG. 2. For each type of fuel, $K_1$ and $K_0$ in the formula are respectively the oxygen concentration corresponding to the peak value of $NO_x$ concentration and the average rate of increase during increase of $NO_x$ the concentration when the fuel supply for a the combustion process is constant and the air supply is steadily increased, as indicated in FIG. 5, and $a_0$, $a_1$, and $a_2$ are empirically determined constants relating to the type of fuel and the combustion process.

The above formula was initially established on the basis of the results of of a series of experiments employing a heavy oil fired boiler unit for which the maximum emission of flue-gas was 30,000 $Nm^3$/hr and the concentration of nitrogen oxides was in the range of from 200 to 400 ppm. In closely controlled conditions making use of the flowmeter 13 and $O_2$ metering unit 17 to determine the calculated value, ($NO_x$ cal), of nitrogen oxide concentration in the upstream flue-gas, it was found that over the entire working range of the boiler unit when the direct-measurement value ($NO_x$ meas) in the upstream flue-gas is taken to be the true value, the relative error of the calculated value ($NO_x$ cal) is within $\pm 0.06$.

Referring again to FIG. 2, output representing the calculated value ($NO_x$ cal) of nitrogen oxide concentration is supplied by the first computing circuit 26 to a second computing circuit 27 included for calculation of the amount of ammonia gas required to be injected into flue-gas passing through the nitrogen oxide removal unit 16, this calculation being made on the base of the calculated concentration of nitrogen oxide, ($NO_x$ cal), upon receiving inputs from the flowmeter 13 and $O_2$ metering unit 17 through signal lines 'a' and 'b'.

The output from the second computing circuit 27 is supplied along the abovementioned external signal line 'e' to the subtraction and conversion unit 24, and to a multiplier 28 which is included or excluded in the computing unit 14 and multiplies the result obtained by the second computing circuit 27 by a correction factor permitting more precise determination of the requisite amount of ammonia gas to be injected into the flue-gas. This correction factor is supplied from the subtraction and conversion unit 24 which subtracts the metering unit 22 output from the output of the second computing circuit 27 input and converts it to comparable values, and supplies to the limiter 25 a correction factor which is related to the result of this subtraction. The input supplied to the subtraction and converter 24 from the second computing circuit 27 is the value, ($NO_x$ cal), which is applied for employment in calculation of the required amount of ammonia gas and the value of the output of the downstream $NO_x$ metering unit 22 is subtracted from this input. In this case also, however, since the inputs to unit 24 represent upstream and downstream concentrations of nitrogen oxide, the simple difference between the inputs would be unsuitable as a correction factor, and the unit 24 therefore converts the difference to a suitable factor, by demultiplication thereof by a constant, for example, and supplies the calculated correction factor to the limiter 25, which supplies the correction factor along the signal line 'f' to the multiplication circuit 28, on condition that the correction factor is within a certain range of values, as noted above. The limiter unit 25 is provided since it is also possible for the downstream $NO_x$ metering unit 22 to become faulty, the limiter unit 25 acting to prevent a correction factor based on completely false output values produced by the metering unit 22 from being supplied to the multiplication circuit 28. Essentially the same function is of course achieved if instead of being provided between the subtraction and conversion unit 24 and the computing unit 14 the limiter unit 25, set to pass different values, is provided between the subtraction and conversion unit 24 and the downstream $NO_x$ metering unit 22.

Assuming a correction factor is passed by the limiter unit 25, the multiplication circuit 28 multiplies the output of the second computing circuit 27 output by the correction factor, thereby obtaining a new value of ammonia gas to be injected which has been revised on the basis of actual $NO_x$ removal results achieved. The result of this multiplication by the multiplication circuit 28 is supplied along signal line 'c' to the control unit 21 to control the amount of ammonia gas to be injected into the nitrogen oxide removal unit 16, the control unit 21 compares this input with input from the ammonia flowmeter 19, and, if necessary, makes an appropriate adjustment to the degree of opening of the control valve means 20, as noted earlier.

Thus the method and means of the invention ensure close control over the supply of a reducing agent into flue-gas for removal of nitrogen oxide, and considerably reduces the danger of injection of excessive amounts of reducing agent into flue-gas due to an incorrect measurement or faulty metering equipment, since the reducing agent supply rate is determined on the basis of two separate values indicating nitrogen oxide concentration, one calculated by the computing unit 14 and one obtained by direct measurement of the downstream $NO_x$ metering unit 22, the calculated value being moreover obtained by means of a carefully determined formula rather than by simple multiplication of measured values.

Moreover, fine adjustment to control input for determing the rate of ammonia gas supply is afforded by the output of the downstream $NO_x$ metering unit 22 and it is thus made possible to maintain the rate of reducing agent supply very close to the optimum rate of supply.

In terms of reliability of the system it is to be noted that according to the method of the invention different factors determining the rate of supply of reducing agent so to speak balance one another, and are obtained as independent values from different parts of a process liable to produce nitrogen oxides. The oxygen ($O_2$) metering unit 17 is of course exposed to more or less the same severity of conditions relative to corrosion, heat, etc., as the downstream $NO_x$ metering unit 22. In other words, the metering unit 17 is also liable to deteriorate, resulting in incorrect measurement. However, in practical terms it is possible to maintain the control means as a whole compact and economical and not provide further control elements since, because, as is known, there are available oxygen analyzers having a sturdy construction, in the present state of the art oxygen analyzers being much more resistant to severe ambient conditions then $NO_x$ analyzers, and also because, even supposing there is a certain deterioration of the $O_2$ metering unit 17, and the unit 17 indicates a slightly incorrect value, the measured value of oxygen in the formula employed for calculating nitrogen oxide concentration only has a certain weight and being a negative value in the formula is in effect a compensating factor rather than a principal determining factor.

Needless to say, the same advantages are obtained if a $NO_x$ reducing agent other than ammonia gas is employed and the factors employed in calculating $NO_x$ concentration in the upstream flue-gas are not limited to fuel flow rate and concentration of oxygen in the flue-gas, but it is also possible to employ factors such as the flow rate of air supplied for effecting the combustion process as shown in FIG. 4 or concentration of carbonic acid gas, for example, or any other factors which are known to vary proportionally to or to affect $NO_x$ production.

Figure 3:
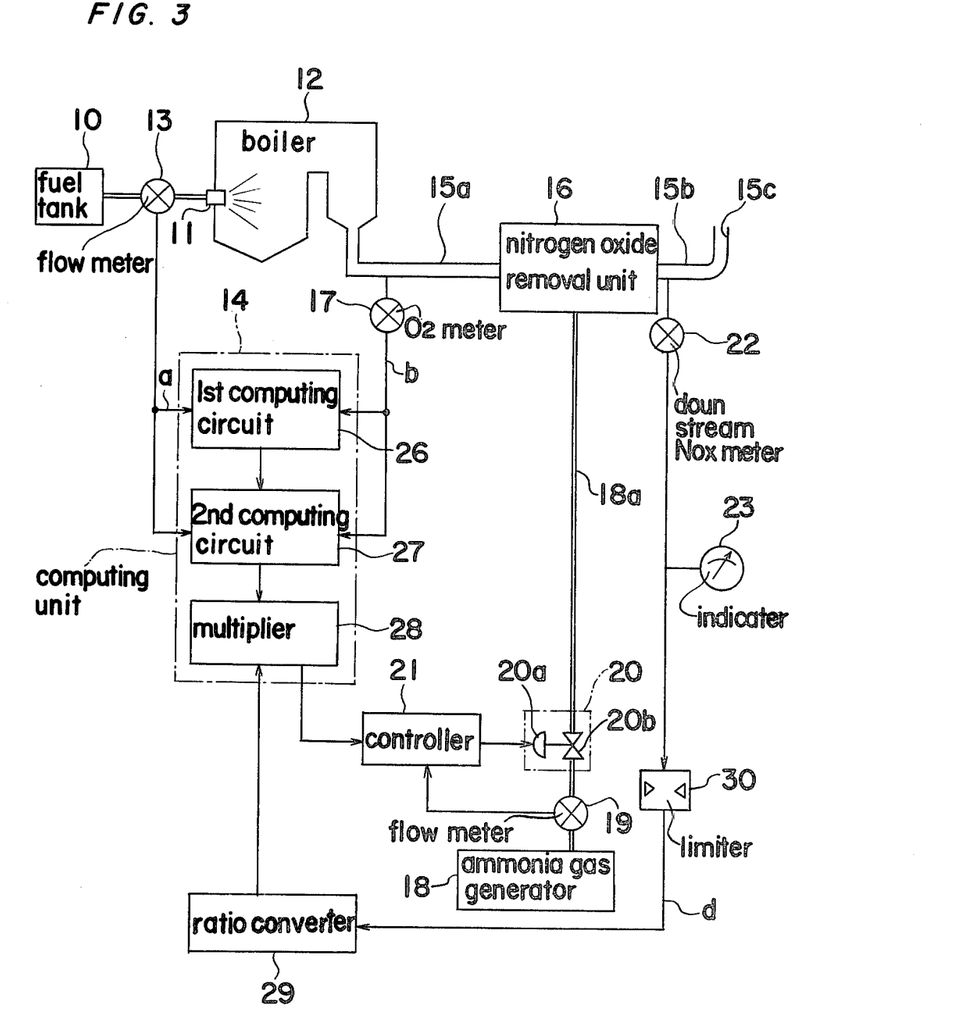
FIG. 3 is a similar block diagram similar to FIG. 2, showing one modification of the first embodiment.

The subtraction and conversion unit 24 shown in FIG. 2 may be modified by the employment of a ratio converter 29 in associated with a limiter unit 30 as shown in FIG. 3. In this embodiment, the subtraction and conversion unit and its signal line 'e' are dispensed with, and the limiter unit 25 is repositioned so as to be disposed between the downstream $NO_x$ metering unit 22 and the ratio converter 29 the of which is supplied to the multiplication circuit 28. The limiter unit 30 is provided since it is also possible for the downstream $NO_x$ metering unit 22 to become faulty, and the limiter acts to prevent completely false output values produced by the metering unit 22 from being supplied to the ratio converter 29 which is provided to produce an output for amending the second computing circuit output in relation with measured values of the downstream $NO_x$ metering unit 22 and, for example, an allowable design value of the $NO_x$ concentration in the continuation discharge pipe 15b downstream of the nitrogen oxide removal unit 16. The computing unit 14 receives inputs from the $O_2$ metering unit 17 and fuel flowmeter 13, computes the amount of ammonia gas or other $NO_x$ reducing agent required to be injected into the flue-gas on the basis of the inputs indicating fuel flow rate and upsteam flue-gas oxygen concentration supplied thereto, and supplies corresponding control input to the flow control unit 21. To meet the object of the invention to provide control input which is based on balanced factors relating to $NO_x$ production and concentration in the flue-gas, and is therefore more reliable, the input control means also suitably makes use of feedback from the downstream $NO_x$ metering unit 22, output from metering unit 22 which is within a certain range being passed through a limiter 30, provided in case of malfunction of the metering unit 22, then to the ratio converter 29 which produces a correction factor related to metering unit 22 output received and supplies the correction factor to the computing unit 14 which multiplies the basic calculation value of required ammonia gas by the correction factor and supplies control input corresponding to the result of this multiplication to the control unit 21. This embodiment of the invention has the advantage that less equipment is required, and that the computing units employed may be simpler.

Figure 6:
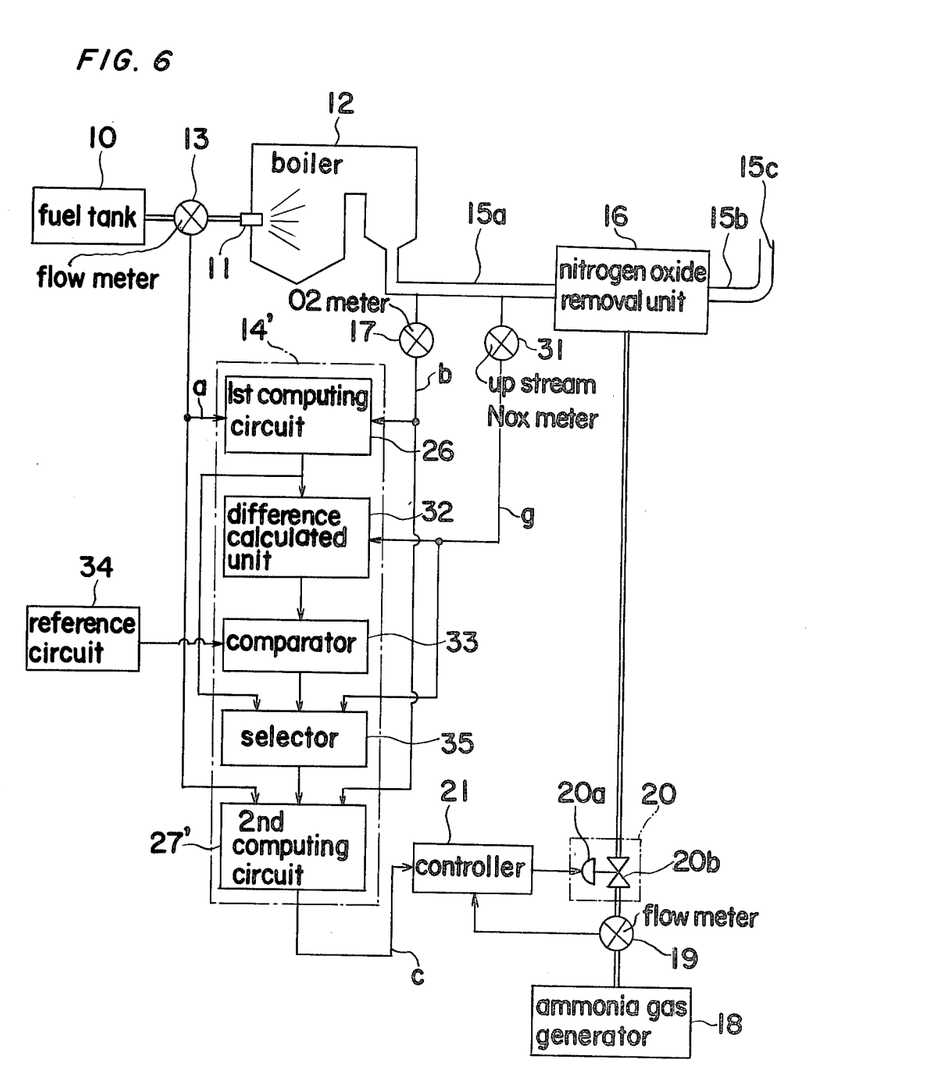
FIG. 6 is a block diagram of a nitrogen oxide removal unit control means according to a second embodiment of the invention.

In view of the closeness of the calculated value and the directly measured value of $NO_x$ concentration in upstream flue-gas, it is preferably to provide an upstream nitrogen oxide $NO_x$ meter or metering unit 31 on the initial discharge pipe 15a replacing the downstream nitrogen oxide $NO_x$ metering unit 22, as is done in another embodiment of the invention shown in FIG. 6. In this embodiment, on the initial discharge pipe 15a there is provided the oxygen $O_2$ metering unit 17 and upstream nitrogen oxide $NO_x$ metering unit 31, both metering units 17 and 31 including magnetic or chemical luminescent known types of gas analyzing elements and an electrical take off which produce continuous output or output pulses indicative of values relating to the respective gases and supplied to a computing unit 14'. The computing unit 14' also receives input from the fuel flowmeter 13, computes the amount of ammonia gas or other $NO_x$ reducing agent required to be injected into the flue-gas on the basis of the inputs indicating fuel flow rate and upstream flue-gas oxygen concentration and nitrogen oxide concentration supplied thereto, and supplies corresponding control input to the flow control unit 21. The computing unit 14' includes the first computing circuit 26 which receives input signals from the flowmeter unit 13 indicative of the fuel supply rate through the signal line 'a' and from the $O_2$ metering unit 17 indicative of the amount of oxygen present in the upstream flue-gas through the signal line 'b'. The first computing circuit 26 calculates the concentration of nitrogen oxide ($NO_x$ cal) in the upstream flue-gas as a function of fuel supply Q and oxygen $O_2$ present in the upstream flue-gas, while the direct-measurement value of nitrogen oxide concentration ($NO_x$ meas) in the upstream flue-gas is obtained by the upstream nitrogen oxide metering unit 31. The output representing the calculating value ($NO_x$ cal) of nitrogen oxide concentration is supplied by the first computing circuit 26 to a difference calculation circuit 32 which also receives as an input signals which indicate direct measured values ($NO_x$ meas) of nitrogen oxide concentration which are supplied thereto from metering unit 31 along a signal line 'g'. The difference calculation circuit 32 subtracts the ($NO_x$ meas) value from the ($NO_x$ cal) value and produces an output which indicates the absolute value of the difference of these values and is supplied as input having a positive value to a comparator 33. The difference calculation circuit 32 may be constituted by a subtractor circuit for performing subtraction to generate an absolute value of $|(NO_x \text{ cal}) - (NO_x \text{ meas})|$.

The comparator 33 determines whether the input received from the difference calculating circuit 32 is within an externally set range, which is determined by a reference circuit 34 according to upper and lower limits of nitrogen oxide concentration which are known from experience in the upstream flue-gas, and which is set suitably just within these upper and lower limits.

Output from the comparator 33 indicating whether or not the difference between the ($NO_x$ cal) and ($NO_x$ meas) values is within the externally set range is supplied as input to a selector 35 which supplies control input to a second computing circuit 27' included for calculation of the amount of ammonia gas required to be injected into the flue-gas passing through the nitrogen oxide removal unit 16, this calculation being made on the basis either the calculated concentration of nitrogen oxide, ($NO_x$ cal), or of nitrogen oxide concentration determined by direct measurement, ($NO_x$ meas).

Under normal conditions when the upstream $NO_x$ metering unit 31 of FIG. 6 is functioning correctly, it is accurate within ±3% and the output thereof can be supposed to give a more precise indication of $NO_x$ concentration than the above-mentioned formula by which $NO_x$ concentration is calculated in the first computing circuit 26 of the computing unit 14'. However, as noted above, because of the severity of ambient conditions, it is possible for the upstream $NO_x$ metering unit 31 to become faulty and indicate completely false values of $NO_x$ concentration, in which case nitrogen oxide concentration in the upstream flue-gas is more accurately represented by the calculated value ($NO_x$ cal).

If the upstream $NO_x$ metering unit 31 is functioning correctly, the difference between the $NO_x$ concentration indicated thereby and the calculated value of nitrogen oxide concentration is within the range externally set in the comparator 33, and the selector 35 produces an output causing the second computing circuit 27' to calculate the required amount of ammonia gas on the basis of the output of metering unit 31. If, however, the upstream $NO_x$ metering unit 31 becomes faulty, the difference between the ($NO_x$ cal) and ($NO_x$ meas) values is outside the set range, and the selector 35 produces an output causing the second computing circuit 27' to calculate the required amount of ammonia gas on the basis of the calculated nitrogen oixde concentration.

There are of course various possible circuit configurations which may constitute the input circuit to the second computing circuit 27'. For example, the second computing circut 27' may receive separate input from the flowmeter 13, $O_2$ metering unit 17 and upstream $NO_x$ metering unit 31, and the output from the selector 35 may be simply a control signal causing circuit 27' to select the input from the $NO_x$ metering unit 31 or the input from the flowmeter 13 and $O_2$ metering unit 17, or instead of being separately supplied to the second computing circuit 27', these various inputs may be selectively passed through the selector 35 to the circuit 27'. The output of the second computing circuit 27' is supplied along signal line 'c' to the control unit 21 to indicate the amount of ammonia gas to be injected into the nitrogen oxide removal unit 16, the control unit 21 compares this input with input from the ammonia flowmeter 19, and, if necessary, makes appropriate adjustment to the degree of opening of the control valve means 20 through the electropneumatic actuator 20a or similar known means as the same manner to that of the first embodiment of FIG. 2. Thus the method and means of this embodiment can produce the same effect as those of the first embodiment of FIG. 2. In running equipment with control means such as shown in FIG. 6 of the second embodiment it was found that input supplied by the computing unit 14' to the control unit 21 was based on the directly measured value of nitrogen oxide concentration ($NO_x$ meas) approximately 90% of the time and on the calculated value of nitrogen oxide concentration ($NO_x$ cal) approximately 10% of the time. Needless to say, however, the means described and shown above may be provided with further elements without departure from the spirit and principles of the invention. For example, externally set discriminators may be provided on the signal lines 'b' and 'g' leading respectively from the oxygen metering unit 17 and upstream nitrogen oxide metering unit 31 to the computing unit 14', in order to prevent measured values outside certain ranges from being supplied to the computing unit 14'. Each such discriminator may of course further supply output indicating when a measured value is outside the set range and this output from both discriminators may be supplies to an AND gate means or OR gate means controlling an alarm unit, for example.

Although the present invention has fully been described by way of example, it is to be noted that various changes and modifications will be apparent to those skilled in the art. For example, as a temporary measure, it is possible to control the supply of ammonia gas or other $NO_x$ reducing agent in response to input only from the fuel flowmeter 13 and upstream $NO_x$ metering unit, or only from the fuel flowmeter 13 and downstream $NO_x$ metering unit, although in either of these methods control is obviously less precise than that effected by the methods and means described in reference to FIGS. 2 through 6, since there is less balancing of control factors, and after a certain period control results are of course liable to be less reliable.

Therefore, these changes and modifications are to be understood as included within the true scope of the present invention unless they depart therefrom.

What is claimed is:

1. A method of controlling input of a nitrogen oxide reducing agent into a system having means for removal of $NO_x$ from flue-gas produced as a result of a combustion process effected in a heating installation and flowing through an exhaust line leading to the exterior of the heating installation and injection into said flue-gas of the nitrogen oxide reducing agent, said method comprising:

metering the value of at least one factor relating to the combustion process from among the factors of fuel flow rate, concentration of oxygen in the flue-gas, concentration of carbonic acid gas in the flow-gas, the flow rate of air employed in the combustion process and the amount of flue-gas, and using said metered value for calculating the $NO_x$ concentration in the flue-gas;

directly measuring the value of the $NO_x$ concentration in the flue-gas flowing in the exhaust line and relating said calculated $NO_x$ value and said directly measured value for establishing a true $NO_x$ value;

determining from said true $NO_x$ value a basic calculation value indicating the requisite amount of nitrogen oxide reducing agent to be injected into said flue-gas; and controlling the supply rate of said reducing agent injected into the flue-gas according to said basic calculation value.

2. A method as claimed in claim 1, wherein said metering step comprises metering the values of at least two of said factors and using the two metered values for calculating the $NO_x$ concentration.

3. A method as claimed in claim 1, wherein the direct measurement of said $NO_x$ concentration is carried out at a point upstream of the point at which the nitrogen oxide reducing agent is injected into the flue-gas.

4. A method as claimed in claim 1, wherein the direct measurement of said $NO_x$ concentration is carried out at a point downstream of the point at which the nitrogen oxide reducing agent is injected into the flue-gas.

5. A method as claimed in claim 1, wherein said metering step comprises metering the value of the fuel flow rate and at least one of said factors of concentration of oxygen in the flue-gas, concentration of carbonic acid gas in the flue-gas, the flow rate of air employed in the combustion process and the amount of flue-gas, and using the two metered values for calculating the $NO_x$ concentration.

6. A method as claimed in claim 1, wherein said metering step comprises metering the values of the fuel flow rate and the concentration of oxygen in said flue-gas and using the two metered values for calculating the $NO_x$ concentration by a formula having the form $$(NO_x\ cal) = a_0 + a_1 Q + a_2 Q^2 - K_0 |(O_2) - K_1|$$

in which ($NO_x$ cal) is the calculated $NO_x$ concentration, Q is the fuel flow rate, ($O_2$) is the oxygen concentration in the flue-gas, and $a_0$, $a_1$, $a_2$ are constants corresponding to the type of fuel and the combustion process and $K_0$ and $K_1$ are constants corresponding to the $NO_x$ concentration.

7. A method of controlling input of a nitrogen oxide reducing agent into a system having means for removal of $NO_x$ from flue-gas produced as a result of a combustion process effected in a heating installation and flowing through an exhaust line leading to the exterior of the heating installation and injection into said flue-gas of the nitrogen oxide reducing agent, said method comprising:
   metering the value of at least one factor relating to the combustion process from among the factors of fuel flow rate, concentration of oxygen in the flue-gas, concentration of carbonic acid gas in the flue-gas, the flow rate of air employed in the combustion process and the amount of flue-gas, and using said metered value for calculating the $NO_x$ concentration in the flue-gas;
   directly measuring the value of the $NO_x$ concentration in the flue-gas flowing in the exhaust line and comparing said calculated $NO_x$ value with said directly measured value and when the difference between said values is within a predetermined range, selecting said directly measured value as a true $NO_x$ value and when the difference between said values is outside a predetermined range, selecting said calculated $NO_x$ value as a true $NO_x$ value;
   determining from said true $NO_x$ value a basic calculation value indicating the requisite amount of nitrogen oxide reducing agent to be injected into said flue-gas; and
   controlling the supply rate of said reducing agent injected into the flue-gas according to said basic calculation value.

8. A method as claimed in claim 7, wherein said metering step comprises metering the values of at least two of said factors and using the two metered values for calculating the $NO_x$ concentration.

9. A method of controlling input of a nitrogen oxide reducing agent into a system having means for removal of $NO_x$ from flue-gas produced as a result of a combustion process effected in a heating installation and flowing through an exhaust line leading to the exterior of the heating installation and injection into said flue-gas of the nitrogen oxide reducing agent, said method comprising:
   metering the value of at least one factor relating to the combustion process from among the factors of fuel flow rate, concentration of oxygen in the flue-gas, concentration of carbonic acid gas in the flue-gas, the flow rate of air employed in the combustion process and the amount of flue-gas, and using said metered value for calculating the $NO_x$ concentration in the flue-gas;
   directly measuring the value of the $NO_x$ concentration in the flue-gas flowing in the exhaust line downstream of the point at which the nitrogen oxide reducing agent is injected into the flue-gas and when said directly measured value is less than a predetermined value, correcting said calculated $NO_x$ value with said directly measured value for establishing a true $NO_x$ value;
   determining from said true $NO_x$ value a basic calculation value indicating the requisite amount of nitrogen oxide reducing agent to be injected into said flue-gas; and
   controlling the supply rate of said reducing agent injected into the flue-gas according to said basic calculation value.

10. A method as claimed in claim 9, wherein said metering step comprises metering the values of at least two of said factors and using the two metered values for calculating the $NO_x$ concentration.

11. An input control means for controlling input of a nitrogen oxide reducing agent into a system having means for removal of $NO_x$ from flue-gas produced as a result of a combustion process effected in a heating installation and flowing through an exhaust line leading to the exterior of the heating installation, said removal means including means for injection into said flue-gas of a nitrogen oxide reducing agent,
   said input control means comprising:
   a metering means for metering at least one factor among the factors of fuel flow rate, flue-gas oxygen concentration, flue-gas carbonic acid gas concentration metering means, air flow rate for the combustion process and the amount of flue-gas, and said metering means producing output signals indicative of the metered values obtained thereby;
   a computing means connected to said metering means for computing from a formula employing values obtained as output from said metering means a base calculation value indicating the requisite amount of nitrogen oxide reducing agent to be injected into the flue-gas;
   a $NO_x$ concentration metering means for directly metering the $NO_x$ concentration in said flue-gas in the exhaust line and producing output signals indicative of the values metered thereby;
   a modification means connected to said computing means and said $NO_x$ concentration metering means for modifying said base calculation value in accordance with the output from said $NO_x$ concentration metering means for obtaining a modified calculation value indicating the requisite amount of nitrogen oxide reducing agent to be injected into said flue-gas; and
   an input control connected to said modification means and regulating the rate of supply of nitrogen oxide reducing agent to said means for injection of the nitrogen oxide reducing agent in accordance with said modified calculation value.

12. An input control means as claimed in claim 11, wherein said metering means comprises means for metering at least two of said factors.

13. An input control means as claimed in claim 11, wherein said $NO_x$ concentration metering means is positioned upstream in the exhaust line from said removal means.

14. An input control means as claimed in claim 11, wherein said $NO_x$ concentration metering means is positioned downstream in the exhaust line from said removal means.

15. An input control means as claimed in claim 11, wherein said metering means comprises a fuel flow rate metering means and a meter for metering at least one factor among the factors of flue-gas oxygen concentration, flue-gas carbonic acid concentration, air flow rate for the combustion process and amount of flue-gas.

16. An input control means as claimed in claim 11, which further comprises a limiter means connected between said $NO_x$ concentration metering means and said modification means for preventing an output of said $NO_x$ concentration metering means which is outside a set range from being supplied to said modification means.

17. An input control means for controlling input of a nitrogen oxide reducing agent into a system having means for removal of $NO_x$ from flue-gas produced as a result of a combustion process effected in a heating installation and flowing through an exhaust line leading to the exterior of the heating installation, said removal means including means for injection into said flue-gas of a nitrogen oxide reducing agent, said input control means comprising:

a metering means for metering at least one factor among the factors of fuel flow rate, flue-gas oxygen concentration, flue-gas carbonic acid gas concentration metering means, air flow rate for the combustion process and the amount of flue-gas, and said metering means producing output signals indicative of the metered values obtained thereby;

a computing means connected to said metering means for computing from a formula employing values obtained as output from said metering means a base calculation value indicating the requisite amount of nitrogen oxide reducing agent to be injected into said flue-gas;

a $NO_x$ concentration metering means for directly metering the $NO_x$ concentration in said flue-gas in the exhaust line and producing output signals indicative of the values metered thereby;

a difference circuit connected to said computing means and said $NO_x$ concentration metering means and receiving the respective outputs therefrom and for producing an output corresponding to the difference between said inputs;

a comparator connected to said difference circuit and receiving output of said difference circuit for producing an ON signal when said difference circuit output is inside a particular range and an OFF signal when said difference circuit output is outside said particular range;

a selection circuit connected to said comparator and to said $NO_x$ concentration metering means for receiving the output of said comparator and for transmitting the output of said $NO_x$ metering means when said comparator output is an ON signal and transmitting the output of said computing means when said comparator output is an OFF signal; and an input control connected to said selection circuit and regulating the rate of supply of nitrogen oxide reducing agent to said means for injection of the nitrogen oxide reducing agent in accordance with the output from said selection circuit.

18. An input control means as claimed in claim 17, wherein said metering means comprises means for metering at least two of said factors.

19. An input control means for controlling input of a nitrogen oxide reducing agent into a system having means for removal of $NO_x$ from flue-gas produced as a result of a combustion process effected in a heating installation and flowing through an exhaust line leading to the exterior of the heating installation, said removal means including means for injection into said flue-gas of a nitrogen oxide reducing agent, said input control means comprising:

a metering means for metering at least one factor among the factors of fuel flow rate, flue-gas oxygen concentration, flue-gas carbonic acid gas concentration metering means, air flow rate for the combustion process and the amount of flue-gas, and said metering means producing output signals indicative of the metered values obtained thereby;

a computing means connected to said metering means for computing from a formula employing values obtained as output from said metering means a base calculation value indicating the requisite amount of nitrogen oxide reducing agent to be injected into said glue-gas;

a $NO_x$ concentration metering means for directly metering the $NO_x$ concentration in said flue-gas in the exhaust line and producing output signals indicative of the values metered thereby;

a converter connected to said $NO_x$ concentration metering means for converting the output from said $NO_x$ concentration metering means to a correction factor and producing an output signal corresponding to said correction factor;

a correction circuit connected to said converter and said computing means for receiving the outputs from said converter and said computing means and multiplying said inputs and producing an output signal corresponding thereto;

a limiter means connected between said converter and said correction circuit for preventing the output of said converter which is outside a predetermined range from being supplied to said correction circuit; and an input control connected to said correction circuit and regulating the rate of supply of nitrogen oxide reducing agent to said means for injection of the nitrogen oxide reducing agent in accordance with said modified calculation value.

20. An input control means as claimed in claim 19, wherein said metering means comprises means for metering at least two of said factors.

* * * * *